Figure 1:
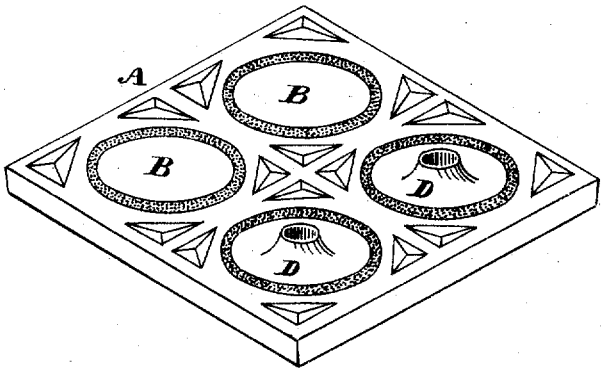

W. LYNCH, Dec'd.

T. & T. Thompson, Assignees of Catharine Lynch, Sole Devisee.

VAULT COVERS.

No. 7,323. Reissued Sept. 26, 1876.

Witnesses

Geo. H. Strong.

Jno. L. Bone

Inventor

Thomas Thompson

Thornton Thompson

Assignees of William Lynch Dec'd

Dewey & Co

Attys

N. PETERS, PHOTO-LITHOGRAPHER, WASHINGTON, D. C.

UNITED STATES PATENT OFFICE.

THOMAS THOMPSON AND THORNTON THOMPSON, OF SAN FRANCISCO, CALIFORNIA, ASSIGNEES OF CATHARINE LYNCH, SOLE DEVISEE OF WM. LYNCH, DECEASED.

IMPROVEMENT IN VAULT-COVERS.

Specification forming part of Letters Patent No. 152,135, dated June 16, 1874; reissue No. 7,323, dated September 26, 1876; application filed September 4, 1876.

*To all whom it may concern:*

Be it known that, WILLIAM LYNCH, late of the city and county of San Francisco, and State of California, did invent an Improved Ventilator for Illuminating-Tiles; and we do hereby declare the following description and accompanying drawings are sufficient to enable any person skilled in the art or science to which it most nearly appertains to make and use the said invention or improvement without further invention or experiment.

The invention relates to an improved device and method for ventilating such rooms, whether they are under or above ground, as are lighted by means of thick translucent blocks of glass, known as "dead-lights," set in metallic frames, and which are known when thus combined as illuminating-tiles. The air in such rooms is always unwholesome, unless some effective means be provided for allowing fresh air from the outside atmosphere to enter and circulate inside of them.

The illuminating-tiles are usually placed in the roof overhead, and, in the case of basements and excavations under a sidewalk, they are placed in the sidewalk, and form a part of the pavement over which the foot-travel of a street passes.

Any device, therefore, which is used for ventilation must not obstruct or interfere with the uniformity of the surface of the pavement, or it will be objectionable.

For the purpose of ventilation individual dead-lights have sometimes been removed from the metallic frame or illuminating-tile, so as to allow the air to enter the room or apartment; but this, besides making an ugly hole in the pavement, will admit water when it rains, and a large quantity of dust in dry weather, and upon the approach of winter or a wet season the removed block must be replaced to prevent the room or apartment from being flooded with water. It also makes a strong upward draft, that is very disagreeable to pedestrians. Such devices are, therefore, only temporary, and cannot be considered as permanent or practical means of ventilation.

Capped openings have been used, but in every such case the opening itself must be more or less below the level of the pavement surface, in order to allow the cap to be flush with the traveled surface, and not form an obstruction. In this case, when the pavement is covered with water, in times of heavy rains, the opening serves as a water-spout, to run a large quantity of water into the apartment underneath.

The invention obviates all difficulty, and provides complete and permanent ventilation for such rooms, as will appear in the following specification, in which—

Figure 2:
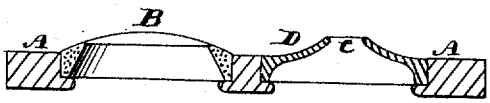

Figure 1 represents a perspective view, showing an illuminating-tile, with the ventilators combined with the dead-lights. Fig. 2 is a sectional view, showing transverse configuration of ventilator.

Let A represent the metallic frame of an illuminating-tile, which can be made of any desired size, and supplied with as many dead-lights B, and ventilators D, as desired.

The ventilators can be either cast as a permanent part of the metallic frame, or they can be made separately, corresponding in size and shape with the size and shape of the openings in which the dead-lights B are placed. We prefer the latter plan, because it enables me to arrange the ventilators in any desired manner with reference to the dead-lights, and to use a larger or smaller number of ventilators, to suit the location of the tile and the requirements of the apartments to be ventilated.

When we use insertible ventilating-blocks, as at D, Fig. 2, we make each one with its upper surface convex or crowning toward the center, and directly in the center we make a hole through the block, which serves as a ventilating-opening. The center of the block about the hole is made about as high as the tops of the glass lights, and it descends gradually toward the edges, thus producing a protuberance that will not obstruct travel, but will rather furnish a firm foot-hold for the person who steps upon it, when often he would slip on glass, if glass alone were used in the tile.

The hole E, in the center of the block or ventilator, need not be more than half an inch in diameter, because we can use several ventilators in each tile, and multiply them so as to provide any required amount of ventilation. The crowning form of the upper side of the ventilator will prevent water from running through the opening, even if the surface of the pavement be covered with a thin sheet of water, as often happens during heavy rains. The action of the opening is respiratory, and it, therefore, ventilates the room or apartment by allowing the foul air to escape, while fresh air is supplied from some other source, and as drops of rain will not pass through the openings, as has been proven by actual experience, we attribute the fact to their dissipation by the strong upward draft or current of air which is continually passing upward through the opening.

For the purpose of saving metal we make the under side of the ventilator concave, as represented, but it might be made of any desired thickness or shape without interfering with the functions of the ventilating-opening. These ventilators can also be used without the dead-lights when ventilation only is desired.

Having thus described the invention, what is claimed, and desired to be secured by Letters Patent, is—

1. An illuminating-tile frame, A, provided with dead-lights B, and removable ventilators D, constructed substantially as and for the purpose set forth.

2. An illuminating-tile frame, A, provided with dead-lights B, and crowning or convex removable ventilators D, having a central hole through its apex, substantially as and for the purpose described.

3. An insertible ventilator for dark rooms, combined with an illuminating-tile, when the ventilators are made to correspond in size and shape with the size and shape of the openings of the dead-lights in the frame, substantially as and for the purpose specified.

4. A removable respiratory ventilator for illuminating-tiles, consisting of a crowning or convex section or block, D, having a hole, E, passing vertically through its center, for the purpose specified.

THOMAS THOMPSON.
THORNTON THOMPSON.

Witnesses:
JOHN L. BOONE,
GEO. H. STRONG.